(12) United States Patent
Albrecht et al.

(10) Patent No.: US 11,378,924 B2
(45) Date of Patent: Jul. 5, 2022

(54) METHOD AND CONTROL DEVICE FOR CONTROLLING A TECHNICAL SYSTEM

(71) Applicant: Siemens Aktiengesellschaft, Munich (DE)

(72) Inventors: Sebastian Albrecht, Hallbergmoos (DE); Bernd Kast, Ichenhausen (DE); Armin Nurkanovic, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/241,251

(22) Filed: Apr. 27, 2021

(65) Prior Publication Data
US 2021/0333766 A1 Oct. 28, 2021

(30) Foreign Application Priority Data
Apr. 28, 2020 (EP) .................................... 20171827

(51) Int. Cl.
*G05B 15/02* (2006.01)
*G05B 13/04* (2006.01)

(52) U.S. Cl.
CPC ......... *G05B 13/042* (2013.01); *G05B 13/048* (2013.01); *G05B 15/02* (2013.01)

(58) Field of Classification Search
CPC ..... G05B 13/042; G05B 13/048; G05B 15/02
See application file for complete search history.

(56) References Cited

U.S. PATENT DOCUMENTS

| 10,338,542 B2 | 7/2019 | Düll et al. |
| 2005/0268063 A1* | 12/2005 | Diao ...................... G06F 9/5083 711/170 |
| 2016/0147203 A1 | 5/2016 | Di Cairano et al. |
| 2019/0038244 A1* | 2/2019 | Flohr ................... G01N 23/046 |
| 2020/0019129 A1* | 1/2020 | Sircar ................ G05B 23/0254 |

FOREIGN PATENT DOCUMENTS

DE 102014212747 A1 1/2016

* cited by examiner

*Primary Examiner* — Christopher E. Everett
(74) *Attorney, Agent, or Firm* — Schmeiser, Olsen & Watts LLP

(57) ABSTRACT

Provided is a state data of the technical system are captured and fed into a controller, which is configurable by control parameters, in order to control the technical system on the basis of the state data. Furthermore, complexity data quantifying a present computation complexity for the controller are captured and transmitted to a control planner. The control planner takes the complexity data as a basis for ascertaining an updated control parameter that renders the control currently more performant, according to a predefined performance measure, than as a result of the previous control parameter. The controller is then reconfigured by the updated control parameter.

10 Claims, 2 Drawing Sheets

METHOD AND CONTROL DEVICE FOR CONTROLLING A TECHNICAL SYSTEM

CROSS-REFERENCE TO RELATED APPLICATIONS

Figure 1:
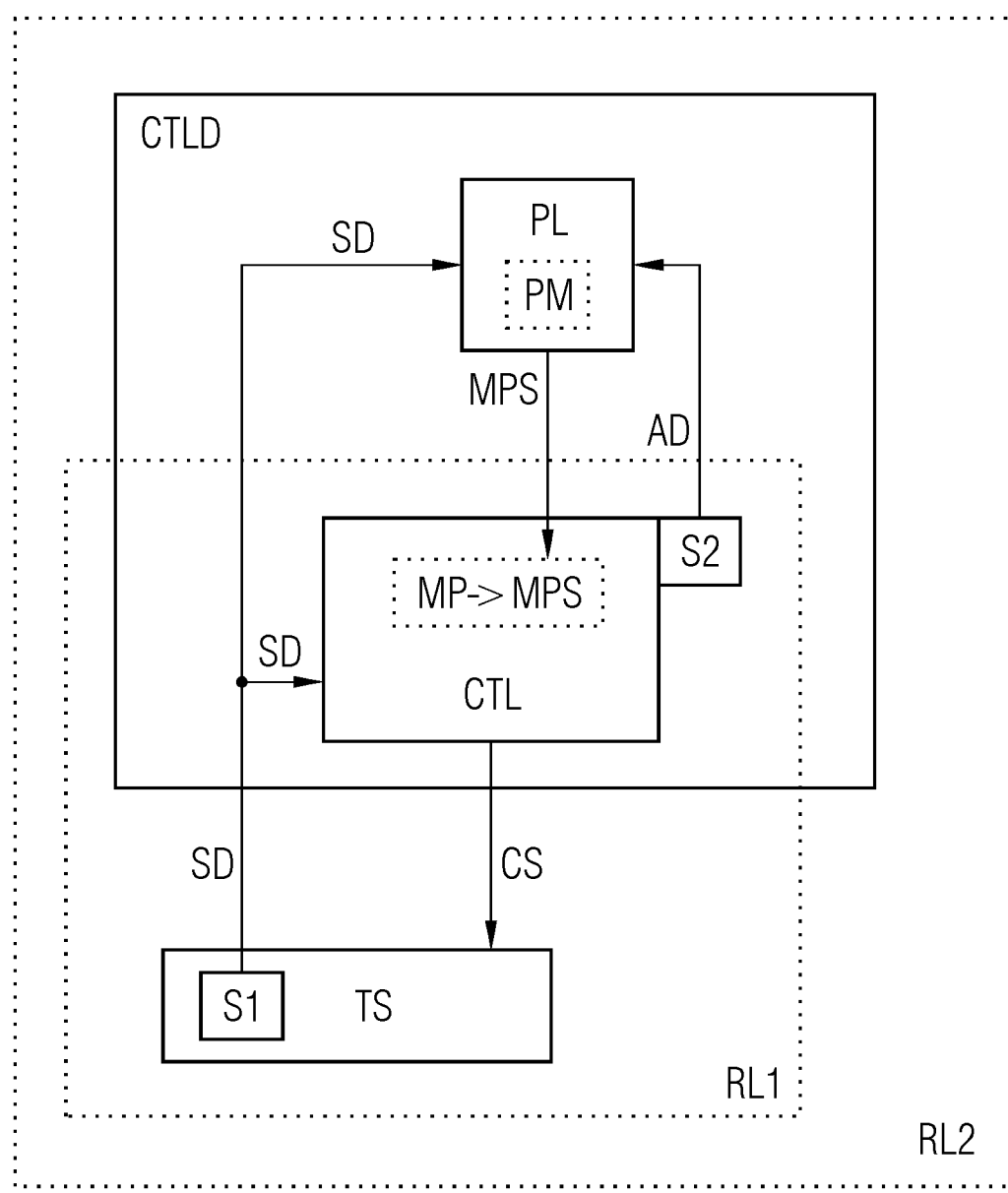

This application claims priority to European Application No. 20171827.7, having a filing date of Apr. 28, 2020, the entire contents of which are hereby incorporated by reference.

FIELD OF TECHNOLOGY

The following relates to a computer-implemented method for controlling a technical system.

BACKGROUND

Control of complex technical systems, such as for example robots, wind turbines, gas turbines, motors, internal combustion engines, production installations or power transmission networks, is usually based on a multiplicity of control loops for controlling actions of the technical system or its components.

The control systems are usually accordingly designed to optimize a performance of the technical system, for example its capacity, its accuracy, its speed, its resource consumption, its pollutant emissions or a combination of these, according to predefined criteria.

In many cases, however, these criteria can change during the performance of actions or on the basis of operating states. This is the case for example with a robot arm that is supposed to grip a small object. While the robot arm is at a greater distance from the object, its movement trajectory does not need to be controlled especially accurately. Instead, the speed of movement can more likely be increased. This preference changes as soon as the robot arm gets close to the object and is supposed to grip it.

At present, controllers are frequently configured such that the resulting control method satisfies the respective criteria under the greatest possible number of, or all, operating conditions. The configuring control parameters or meta parameters are often ascertained manually by experts in this case. The resulting control parameters are frequently unnecessarily conservative for many operating conditions, however.

Furthermore, it is known that various sets of control parameters are used in order to take into account changing control criteria. The ascertainment of such sets of control parameters frequently requires a high level of complexity, however. Furthermore, changing of the control parameters is often tied to rigid guidelines and therefore only slightly flexible.

SUMMARY

An aspect relates to a method and a control device for controlling a technical system that are more adaptable to different operating conditions.

To control a technical system, state data of the technical system are captured and fed into a controller, the control method of which is configurable by a control parameter. The control parameter in this instance can in particular also be a multidimensional parameter vector in a parameter space. The technical system is controlled by the controller on the basis of the state data in a first control loop using the control method. Furthermore, complexity data quantifying a present computation complexity for the controller are captured and transmitted to a control planner.

The control planner takes the complexity data as a basis for ascertaining an updated control parameter that renders the control method currently more performant, according to a predefined performance measure, than as a result of the previous control parameter. Such a performance measure can relate in particular to a performance of the controller and/or of the technical system, for example a control accuracy, a control speed, a performance accuracy, a performance speed and/or a weighted combination of these. The controller is then reconfigured by the updated control parameter.

To perform the method according to embodiments of the invention there is provision for a control device, a computer program product (non-transitory computer readable storage medium having instructions, which when executed by a processor, perform actions) and a computer-readable, preferably non-volatile, storage medium.

The method according to embodiments of the invention and the control device according to embodiments of the invention can be embodied or implemented for example by one or more computers, processors, application-specific integrated circuits (ASICs), digital signal processors (DSPs) and/or so-called "field programmable gate arrays" (FPGAs).

An advantage of embodiments of the invention can be seen in particular in that the control system can react in an optimized or at least advantageous manner in many cases by automatically reconfiguring the controller for changes of operating conditions. In particular, a control system according to embodiments of the invention can take into account a changing computation complexity for the controller in an advantageous manner. As such, a more accurate control system frequently calls for a higher computation complexity for the controller. In such cases, for example optimized coordination of a control accuracy with a performance speed for an action while computation load is currently high can result in the control accuracy being temporarily subject to increased optimization costs. It can be seen that embodiments of the invention can be applied in a particularly advantageous manner to controllers that require relatively high computation complexity, such as for example model predictive controllers or MPC controllers.

Advantageous embodiments and developments of the invention are specified in the dependent claims.

According to one advantageous embodiment of the invention, the complexity data captured can be a processor load, a temperature, a resource use, a program runtime and/or a time requirement of the controller. The above complexity data quantify a present computation complexity for the controller and can frequently be measured or captured otherwise in a simple manner. Furthermore, other variables dependent on or caused by the computation complexity for the controller can also be captured as complexity data. In an embodiment, complexity data that relate to a hardware of the controller can be captured.

According to another advantageous embodiment of the invention, the capture of the complexity data, the ascertainment of the updated control parameter and the reconfiguration of the controller can be performed in a second control loop. In this way, the control method can be dynamically adapted for a present computation load on the controller in an automatic manner.

Furthermore, state data of the technical system can also be transmitted to the control planner, and the updated control parameter can be ascertained on the basis of these state data. By additionally taking into account present state data it is possible for control parameters to be better adapted for present operating states of the technical system in many cases.

According to another advantageous embodiment of the invention, the control planner can ascertain a parameter range comprising first control parameters in such a way that the control method configured in each case by the first control parameters has better performance, according to the performance measure, than the control method configured in each case by other control parameters. The parameter range can be regarded in particular as a range or generally as a subset of a parameter space for the control parameter. First control parameters can be assigned to the parameter range on the basis of a comparison of the performance measures that result in each case, for example.

Following ascertainment of the parameter range, a search for the updated control parameter can generally be restricted to the ascertained parameter range. Consequently, the parameter range can advantageously be ascertained by the control parameter beforehand in order to preclude less-than-optimum control parameters in regard to the search for the updated control parameter in advance already.

In an embodiment, various performance variables relating to a resulting performance can be ascertained for a respective control parameter. The performance variables can be ascertained in particular specifically for various states of the technical system and/or for different computation loads of the controller. The parameter range can then be assigned those control parameters for which a performance variable essentially cannot be improved without impairing another performance variable in the process. Control parameters that do not satisfy the above condition can accordingly be precluded from the parameter range.

The parameter range ascertained can preferably be a Pareto set, in particular in regard to the performance variables and/or the performance measure. Such a Pareto set is frequently also referred to as a Pareto front. The elements of a Pareto set satisfy the above condition insofar as a respective target property cannot be improved without impairing another target property in the process. A large number of optimization methods are available for ascertaining a Pareto set.

Following ascertainment of the parameter range, the updated control parameter can be selected from the parameter range on the basis of the state data and/or the complexity data. If the parameter range can be severely limited in comparison with the full parameter space in many cases, a complexity for ascertaining the updated control parameter normally decreases considerably. In many cases, the ascertainment of the updated control parameter and the reconfiguration of the controller can therefore take place during the operation of the controller.

According to another advantageous embodiment of the invention, the controller can temporally extrapolate state data and control the technical system on the basis of the temporally extrapolated state data. For the purpose of temporal extrapolation the controller can use a process model that models a temporal behavior of the technical system or one of its components over a predefined time horizon. For such forecast-based control systems it is possible to use in particular model predictive controllers or MPC controllers.

BRIEF DESCRIPTION

Figure 2:
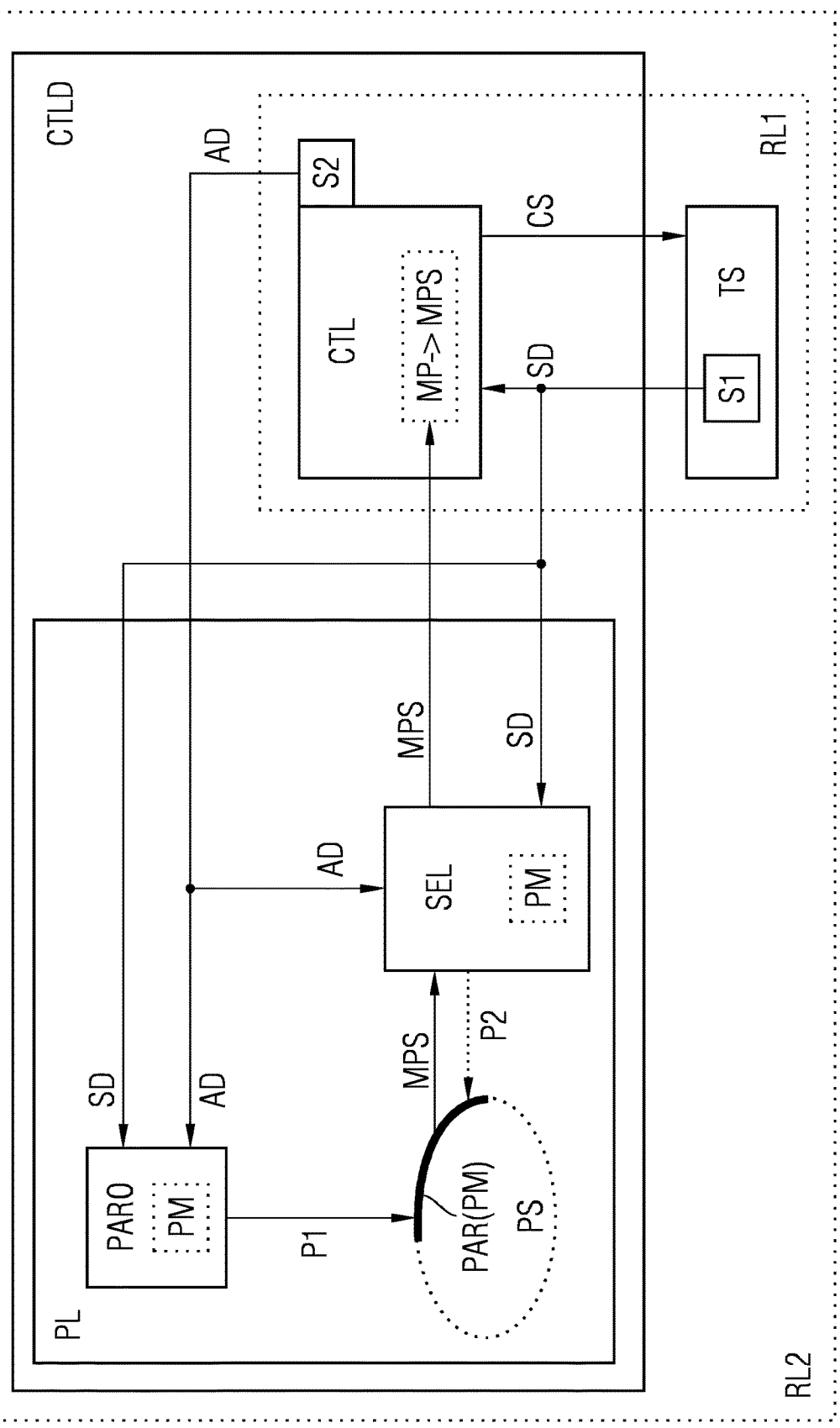

Some of the embodiments will be described in detail, with references to the following Figures, wherein like designations denote like members, wherein:

FIG. 1 shows a control device according to embodiments of the invention when controlling a technical system; and FIG. 2 shows a more detailed depiction of the control device according to embodiments of the invention.

DETAILED DESCRIPTION

FIG. 1 schematically illustrates a control device CTLD according to embodiments of the invention when controlling a technical system TS. The technical system TS controlled can be for example a robot, a wind turbine, a gas turbine, a motor, an internal combustion engine, a production installation, a power transmission network or another machine, another device or another installation. The technical system TS can in particular also be a component or another part of a technical system or a simulated technical system or a simulated component of a technical system.

For the present exemplary embodiment, it will be assumed that the technical system TS is a robot and that the control device CTLD controls a movement of a robot arm, by way of illustration.

The control device CTLD has a processor for performing the method according to embodiments of the invention and a memory for storing data to be processed. The control device CTLD is depicted externally to the technical system TS in FIG. 1. Alternatively, all or part of the control device CTLD can also be integrated in the technical system TS.

The technical system TS has a first sensor system S1 having one or more process sensors for capturing or measuring state data SD of the technical system TS.

The state data SD quantify an operating state of the technical system TS, a process taking place there or other variables relevant to the operation of the technical system TS. The state data SD can comprise for example position data, motion data, process data or physical data, such as temperature, pressure, force exerted, force applied, torque, current, voltage and/or power of the technical system TS or the components thereof. In particular, the state data SD captured can be data about target variables of the technical system TS that should be optimized during operation, such as for example a resource consumption, vibrations or a precision of actions. Furthermore, the state data SD can also comprise optical data captured by a camera or another optical sensor of the first sensor system S1. Furthermore, the state data SD captured can also be other influencing factors relevant to the operation of the technical system TS, such as in particular data about surroundings of the technical system TS.

The first sensor system S1 continually captures present state data SD, in particular when performing controlled actions of the technical system, such as for example during the movement of the robot arm. The currently captured state data SD, which can relate to a present position of the robot arm, for example, are fed as controlled variables into a controller CTL of the control device CTLD, which generates control signals CS for the technical system TS on the basis thereof. The generated control signals CS are output to the technical system TS in order to control the latter. The control signals CS can control a motor of the robot arm, for example.

The capture of the present state data SD and their supply to the controller CTL, the generation of the control signals CS and the control of the technical system TS by the control signals CS form a closed first control loop RL1. The latter can be implemented as a control loop of a model predictive control system, for example. Such a model predictive control system uses a process model to model and temporally extrapolate a behavior of the technical system over a predefined time horizon. The technical system can then be controlled predictively on the basis of the extrapolated behavior.

The controller CTL performs a control method that is configurable by at least one control parameter MP. Such a control parameter is frequently also referred to as a meta parameter and is preferably represented as a multidimensional parameter vector in a parameter space. The control parameter MP can set or configure a sampling rate of a model predictive controller, a type or an accuracy of a numerical integration method, a type or an accuracy of a numerical approximation, a size or an accuracy of a Hessian matrix to be used for optimization, one or more process parameters, a starting value or a tolerance of an optimization method and/or a type or noise characteristics of a sensor, for example. In many cases the control parameter MP influences a control-related computation complexity for the controller CTL.

According to embodiments of the invention, the control device CTLD or the controller CTL comprises a second sensor system S2 for continually capturing or measuring present complexity data AD that quantify a present, in particular control-related, computation complexity for the controller CTL.

The complexity data AD can quantify in particular a processor load, a temperature, a resource use, a program runtime, a time requirement, a power consumption and/or other complexity variables relating to a hardware of the controller CTL.

The second sensor system S2 is preferably coupled to the hardware of the controller CTL and can comprise a temperature sensor arranged on a processor of the controller CTL, for example. Alternatively, or additionally, the second sensor system can capture a present processor load on the controller CTL or can retrieve the processor load from the operating system.

The present complexity data AD and the present state data SD are transmitted from the second sensor system S2 to a control planner PL. The control planner PL is used to ascertain optimized control parameters for configuring the controller CTL. The control planner PL optimizes the control parameters according to a performance measure PM that quantifies a performance of the controller CTL or of its control method and/or a performance of the technical system TS. The performance measure PM is thus a target variable to be optimized by the control planner PL as part of an optimization method.

The performance measure PM can quantify a control accuracy, a control speed, a reaction speed, a performance accuracy, a performance speed and/or a weighted combination of the above variables, for example. In particular, the performance measure PM can also relate to a performance of the technical system TS, for example an energy production, an energy consumption, vibrations, pollutant emissions and/or a precision of actions to be performed.

The control planner PL ascertains—depending on the present complexity data AD and the present state data SD—an updated control parameter MPS that leads to an optimized or particularly high-performance measure PM. For this optimization the control planner PL preferably uses a model of the controller CTL that relates the computation complexity for the controller CTL to the performance of the controller CTL or of the technical system TS and to the state of the technical system TS. In this way, the updated control parameter MPS can be adapted for present operating states of the technical system TS on the basis of the present state data SD and for a present computation load for the controller CTL on the basis of the present complexity data AD.

A multiplicity of optimizing planning programs are available in order to implement the control planner PL. These can be used to express planning tasks in a machine-readable manner, for example by suitable description languages such as PDDL (Planning Domain Definition Language) or OWL (Web Ontology Language), and to process them using automation. Based on a performance measure, such a planner can ascertain performance-optimized control parameters using known optimization methods.

The updated control parameter MPS is transmitted from the control planner PL to the controller CTL. The controller CTL is reconfigured by the updated control parameters MPS, and the control method and hence the first control loop RL1 are adapted for the present operating state of the technical system TS and for the present computation load on the controller CTL in an optimized manner.

The capture of the present state data SD and complexity data AD, their supply to the control planner PL, the ascertainment of the updated control parameter MPS and the reconfiguration of the controller CTL form a second control loop RL2 during operation.

FIG. 2 shows the control device CTLD according to embodiments of the invention with a more detailed depiction of the control planner PL.

Where the same or corresponding reference signs as in FIG. 1 are used in FIG. 2, these reference signs denote the same or corresponding entities, which can be implemented or configured in particular as described above.

As already explained above, the controller CTL configured by the control parameter MP controls the technical system TS on the basis of the currently measured state data SD by outputting control signals CS in a first control loop RL1.

As furthermore explained above, the present state data SD and present complexity data AD measured by the second sensor system S2 are transmitted to the control planner PL, which takes the present state data SD and the present complexity data AD as a basis for ascertaining an updated control parameter MPS.

For this purpose, the control planner PL uses a controller model to forecast a control-parameter-dependent computation complexity for the controller CTL within a predefinable forecast horizon. A multiplicity of efficient controller models are available for this. Such a controller model can in particular model, indicate and/or quantify how a computation complexity for the controller CTL behaves in the event of alteration of a control accuracy and/or a control speed. Generally, computation complexity also increases with control accuracy and/or control speed. The controller model is used to determine the updated control parameter MPS such that the control method configured thereby increases its performance, as quantified by the performance measure PM, in a respective present situation.

By way of example, if the computation load on the controller CTL is currently high, its control accuracy can be temporarily lowered in order to boost a performance speed for an action of the technical system TS instead and thus to increase a level of performance.

The controller model effectively comprises or models a procedural knowledge of relationships of effect or dependencies between performance or state changes of the controller CTL or of the technical system TS and a respectively required computation complexity for the controller CTL.

By contrast, the state data SD and complexity data AD used as criteria for ascertaining the updated control parameter MPS can be regarded as declarative knowledge of the technical system TS or the controller CTL.

To perform advance calculations in a first phase P1 of the method according to embodiments of the invention, the control planner PL comprises a Pareto optimizer PARO. The Pareto optimizer PARO ascertains a so-called Pareto set PAR beforehand by the controller model on the basis of the performance measure PM. The Pareto set PAR is a subset of a parameter space PS comprising possible control parameters.

Such a Pareto set comprises those parameters of a parameter space for which a performance variable, for example a control accuracy, cannot be improved without impairing another performance variable, for example a computation complexity, in the process. A Pareto set is frequently also referred to as a Pareto front.

The control parameters contained in the Pareto set PAR then generally lead to better or at least no worse performance than other control parameters of the parameter space PS. In this way, less-than-optimum control parameters or at least control parameters that do not lead to an improvement can be precluded in advance already, i.e. here in the first phase P1. Multiple known methods are available for ascertaining the Pareto set PAR.

If the control parameters are multidimensional parameter vectors in the parameter space PS, the Pareto set PAR can be a hypersurface or another selected subset of the parameter space PS. In many cases, the Pareto set PAR is very severely limited compared to the whole parameter space PS.

In the present exemplary embodiment, the Pareto set PAR is determined on the basis of state data SD and complexity data AD that are transmitted to the Pareto optimizer PARO for this purpose. By taking into account the state data SD and the complexity data AD it is possible for the Pareto set PAR to be better adapted for an operating situation of the technical system TS and/or for a computation capacity of the controller CTL. An updated control parameter MPS optimizing the performance is selected during normal control operation—subsequently also referred to as second phase P2—by a selection module SEL of the control planner PL from the Pareto set PAR ascertained in the first phase P1. For this purpose, the present state data SD and the present complexity data AD are transmitted to the selection module SEL.

The selection module SEL takes the present state data SD and the present complexity data AD as a basis for selecting an updated control parameter MPS that optimizes the performance measure PM in the present specified situation—specified by the state data SD and the complexity data AD—or at least brings it more into line with an optimum. Advantageously, that control parameter that leads to the best compromise, as quantified by the performance measure PM, between control performance, control stability and control computation complexity in the present situation is selected from the Pareto set PAR as updated control parameter MPS. In particular, that control parameter that leads to the highest performance measure PM can be selected from the Pareto set PAR as updated control parameter MPS.

The selection is made in particular by the forecast model for the computation complexity for the controller CTL and by the process model for the behavior of the technical system TS. The selection of the updated parameter MPS can be adapted for present operating states of the technical system on the basis of the present state data SD and for a present computation load on the controller CTL on the basis of the present complexity data AD.

The updated parameter MPS ascertained by the selection module SEL is transmitted from the selection module SEL to the controller CTL in order to reconfigure the latter, as described above, in a second control loop RL2 during operation.

Since the Pareto set PAR is generally severely limited compared to the full parameter space PS, the complexity for selection of the optimized control parameter MPS decreases considerably in the second phase P2. In many cases, the selection of the updated control parameter MPS and the reconfiguration of the controller CTL can therefore be performed during operation and in real time.

The control method can therefore be dynamically adapted for changes in the computation load on the controller CTL, for changes in the operating situation and/or for changes in performance guidelines in an automatic and optimized manner. In many cases, such dynamic adaptation of control parameters permits the control device CTLD to be used under more operating conditions than in its original configuration. Often, technical systems can therefore be stabilized more quickly after larger disturbances, and undesirable shutdowns can be avoided.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for controlling a technical system, wherein
   providing a controller a control method of which is configurable by a control parameter;
   capturing state data of the technical system and feeding the state data into the controller, wherein the technical system is controlled by the controller on a basis of the state data in a first control loop using the control method;
   capturing complexity data quantifying a present computation complexity for the controller and transmitting the complexity data to a control planner, wherein the control planner takes the complexity data as a basis for ascertaining an updated control parameter that renders the control method currently more performant, according to a predefined performance measure, than as a result of a previous control parameter; and
   reconfiguring the controller by the updated control parameter;
   wherein the state data of the technical system are transmitted to the control planner such that the control planner ascertains the updated control parameter based on both the state data and the complexity.

2. The method as claimed in claim 1, wherein the complexity data are a processor load on the controller, a temperature of the controller, a resource use of the controller, a program runtime of the controller and/or a time requirement of the controller.

3. The method as claimed in claim 1, wherein the capturing of the complexity data, the ascertaining of the updated control parameter and the reconfiguring of the controller are performed in a second control loop.

4. The method as claimed in claim 1, wherein the control planner ascertains a parameter range comprising first control parameters in such a way that the control method configured in each case by the first control parameters has an improved performance, according to the performance measure, than the control method configured in each case by other control parameters.

5. The method as claimed in claim 4, wherein the first parameter range ascertained is a Pareto set.

6. The method as claimed in claim 4, wherein the updated control parameter is selected from the parameter range on the basis of the state data and/or the complexity data.

7. The method as claimed in claim 1, wherein the controller temporally extrapolates state data and controls the technical system on the basis of the temporally extrapolated state data.

8. A control device for controlling a technical system configured to perform a method as claimed in claim 1.

9. A computer program product, comprising a computer readable hardware storage device having computer readable program code stored therein, said program code executable by a processor of a computer system to implement a method configured to perform a method as claimed in claim 1.

10. A computer-readable storage medium having a computer program product as claimed in claim 9.

* * * * *